Dec. 12, 1967  J. J. STAITI  3,357,549
TEAR-OPEN SEALED THERMOPLASTIC FILM PACKAGE
Filed April 29, 1965  2 Sheets-Sheet 2
FIGURE 6.
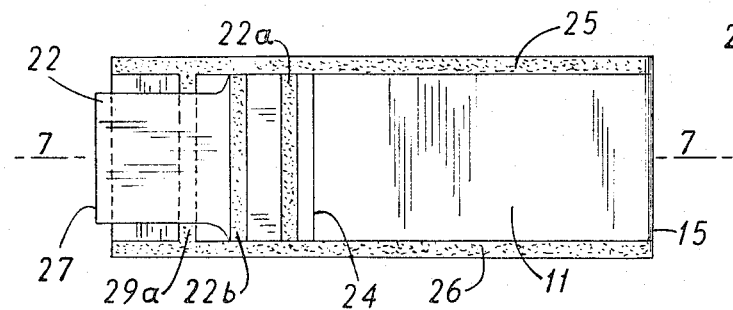
FIGURE 8.
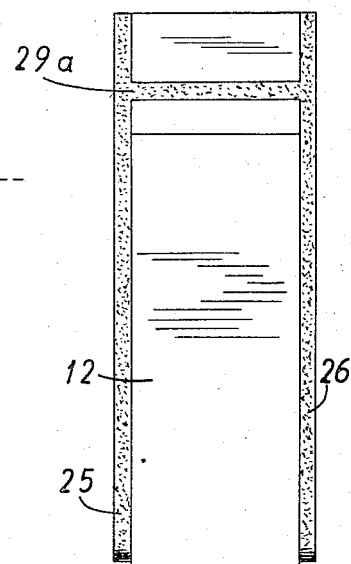
FIGURE 7.
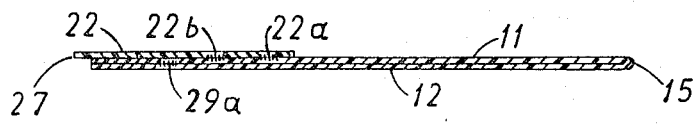
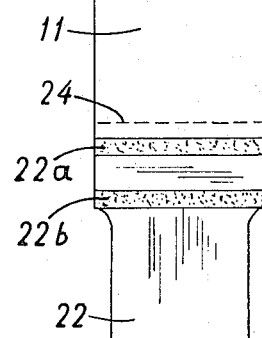
INVENTOR
JAMES J. STAITI
BY
ATTORNEY

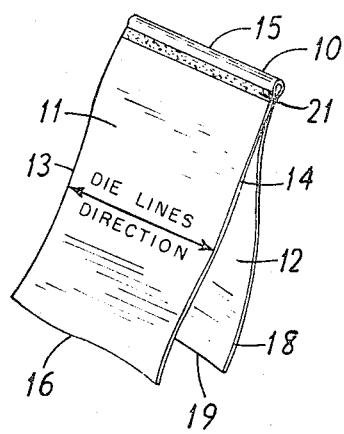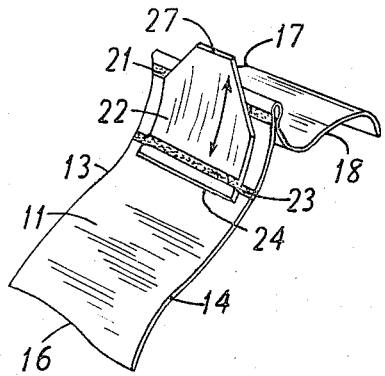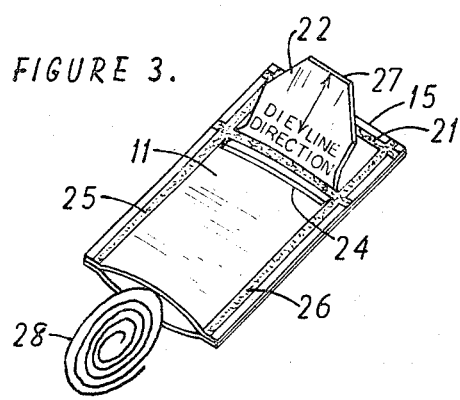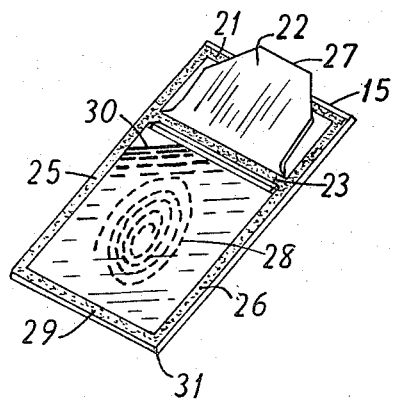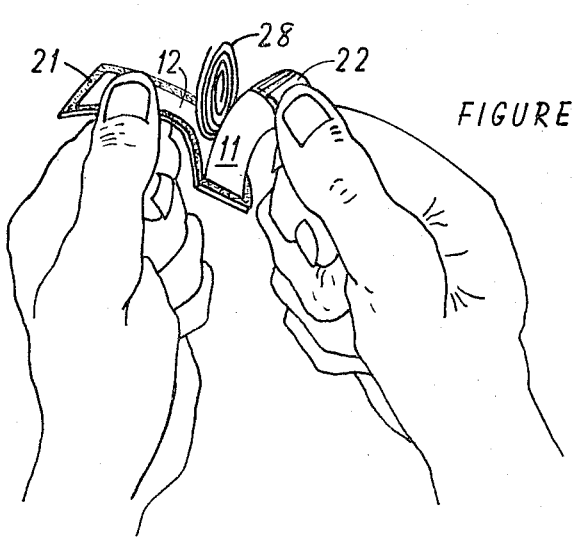

United States Patent Office 3,357,549
Patented Dec. 12, 1967

3,357,549
TEAR-OPEN SEALED THERMOPLASTIC FILM PACKAGE
James J. Staiti, Bernardsville, N.J., assignor to Allied Chemical Corporation, New York, N.Y., a corporation of New York
Filed Apr. 29, 1965, Ser. No. 451,876
10 Claims. (Cl. 206—63.3)

ABSTRACT OF THE DISCLOSURE

Disclosed are tear-open heat sealed thermoplastic film packages having the shape of a pouch, characterized by having a tear tab, of strength greater than the tear strength of the film forming the package, secured to the face of the package intermediate the ends thereof so that the free end of the tab and that end of the package overlaid by the tab may be grasped and the package may be opened by pulling tab and package in opposite direction.

---

This invention relates to tear-open sealed thermoplastic film packages and, more particularly, to such packages containing wet packed surgical sutures, i.e., sutures immersed in sterile conditioning liquids such as aqueous solutions of ethanol and/or isopropanol.

Wet packed surgical sutures in a plastic film package consisting of a double ply or laminated pack or pouch are disclosed, for example, in United States Patent 2,917,878 granted Dec. 22, 1959. The external film of the laminate is a polyester film such as the polymeric ester of ethylene glycol and terephthalic acid (Mylar) and the internal film is polyethylene or polyvinyl chloride. The specification of this patent points out that polyester films alone are difficult to seal with a sealing machine in which the heating elements are in contact with the polyester film because the film tends to melt on the heating bars and thus interfere with production; overmelting and sticking frequently occur. This is one of the reasons for employing the more costly double ply or laminated wall construction of the pack or pouch. Moreover, the use of such laminates for packaging wet packed sutures, particularly when the alcoholic solution comes in contact with the inner layer has been found objectionable because the liquid may have a deleterious effect on the polyethylene inner layer and/or on the laminating primer. Furthermore, the type and design of packages heretofore available do not provide for ready opening of the package to give access to the suture, and this without deleteriously affecting the sterility of the contents of the package.

It is a principal object of the present invention to provide a novel tear-open thermoplastic film package combining the advantages of: (1) single layer of transparent film construction and therefore simple and economical to make; (2) easy opening and this without creating any loose pieces which would be objectionable in the case of a package for use in an operating room; (3) transparency, and hence provides a packaged product having good sales appeal; and (4) the thermoplastic film material has goon strength characteristics and hence provides good protection for the contents of the package.

It is another object of this invention to provide such novel tear-open thermoplastic film package, the thermoplastic film of which has superior barrier and chemical properties, i.e., is substantially impermeable to the passage of air and other gases or vapors therethrough and is not deleteriously affected by the alcoholic solution employed in wet packing sutures to keep the gut soft.

Other objects and advantages of this invention will be apparent from the following detailed description thereof.

While the description which follows will largely be confined to wet suture packages, it will be understood that the invention is not limited thereto and includes tear-open sealed thermoplastic film packages employed for packaging various materials, such as pills, vitamins, ampules, syringes and other articles and materials.

The tear-open sealed thermoplastic film package of this invention comprises a generally rectangular, desirably oblong, protective pouch. For convenience in describing the package, two opposite parallel edges of the pouch will be referred to as the sides; the other two edges as the ends; one of the film surfaces of the pouch as the face and the other as the back. The pouch has the marginal edges of the sides of the face and back heat-sealed together to form marginal side seals defining the sides of the pouch. One end of the pouch is open and the other end closed by heat sealing or by folding a sheet of the film at its transverse median to provide the closed end. A tab, having a tear strength greater than that of the heat sealed marginal side portion of the film and a width approximately equal to the transverse linear distance between the heat seals on the side edges of the pouch, is heat-sealed to the face or back, at one end thereof, with the free end of the tab protruding toward and preferably beyond the adjacent end of the pouch.

The material to be packaged, e.g., the surgical suture, can be placed into the pouch through the open end, or placed in the pouch during its formation, e.g., prior to or concurrently with the heat sealing of the side edges. The open end is heat-sealed after the material is inserted in the pouch to form the completed package. Prior to heat sealing the open end of the pouch, the pouch containing the suture may be sterilized if desired, for example by use of a sterilizing gas such as ethylene oxide or propylene oxide. The open-ended pouch containing the suture in sterile condition may then be filled with a conditioning liquid prior to being heat-sealed.

To open the package it is only necessary to grasp the free end of the tab and the portion of the package beneath the tab, and then move the tab away from the package. Since one end of the tab is free and preferably projects beyond the package, both the free end of the tab and the portion of the package therebeneath are readily accessible. Movement of the tab away from the package causes the thermoplastic film of the package to which the tab is secured to be torn open along the inner edges of the packet seals or in the areas immediately adjacent thereto, thus allowing removal of the suture without fear of contamination.

In the preferred embodiment of the invention, the film from which the pouches are made can be a homopolymer of trifluoromonochloroethylene, or a copolymer of chlorotrifluoroethylene and vinylidene fluoride containing from 0.5% to 10% by weight, preferably 3.5% to 4% by weight of vinylidene fluoride, or a terpolymer of chlorotrifluoroethylene, vinylidene fluoride and tetrafluoroethylene containing from 0.5% to 10%, preferably 1% to 2% vinylidene fluoride and from 0.5% to 10%, preferably 3% to 4% tetrafluoroethylene. These thermoplastics are sold by General Chemical Division of Allied Chemical Corporation under its ACLAR trademark. For the sake of brevity these plastic films will be referred to hereinafter as polyhaloethylene films. The invention, however, is not limited to packages made from polyhaloethylene films; other thermoplastic films, desirably transparent, can be used. The thickness of the film can vary depending upon the desired strength of the package walls; generally a film thickness of about 1 mil will be found satisfactory. The tab desirably is made of the same thermoplastic material as the film although it need not be of the same thermoplastic material. The tab should have a tear strength greater than that of the film to which it is attached; this can be attained by making the tab of a thicker film, e.g., about 2 mils thickness.

In the formation of these films by extrusion, the polymeric structure is oriented so that the film has the lowest tear strength in a direction at right angles to the die lines invariably produced in the extruded film, i.e., the tear strength of the film is greater in the direction of the die lines than it is in a direction at right angles to the die line direction. In forming the pouch, the film to which the tab is secured has its die lines positioned so that they extend perpendicular to the desired tear direction. Thus in the case of the pouch shown in the drawings and hereinafter described, the die lines extend across the width of the pouch, i.e., from one side edge to the other. The tab is preferably somewhat thicker than that of the film forming the pouch, for example, about 2 mils thickness, and is secured to the pouch so that the die lines thereof extend at right angles to those in the film. Thus the tab has a markedly greater tear strength than that of the pouch film to which it is attached. In this way when the tab is grasped and pulled to open the package, the film tears along the heat-sealed edges; the heat sealing weakens the film so that when the tab is grasped and pulled away from the package a clean tear along the inner heat sealed marginal edges, as hereinafter more fully described, occurs. Preferably, a second tab-to-film heat seal parallel to the first heat seal is provided across the end of the pouch to be opened so as to give added firmness when tearing and to afford second tear-open seal in the event the first tear-open seal fails to act in the prescribed manner.

In the accompanying drawings forming a part of this sepcification and showing for purposes of exemplification preferred forms of the tear-open sealed thermoplastic film packages of this invention without limiting the claimed invention to such illustrative instances:

FIGURE 1 is a perspective view showing the film folded to form the walls of a pouch with the folded end heat sealed just below the fold;

FIGURE 2 is a persepective view showing the tab heat sealed to the folded film of FIGURE 1;

FIGURE 3 is a perspective view showing the next step in the formation of the pouch with the side edges of the pouch heat sealed, leaving the pouch open at one end only and showing the insertion through this open end of a sterile suture;

FIGURE 4 is a perspective view showing the sterile suture immersed in a conditioning liquid hermetically sealed within the thermoplastic sealed pouch;

FIGURE 5 illustrates the preferred manner of tearing open the pacakage of FIGURE 4 to allow the removal of the sterile suture without fear of contaminating it;

FIGURE 6 is a plan view of a modified form of pouch having a tear-open tab heat sealed to the face of the pouch;

FIGURE 7 is a vertical section through the pouch of FIGURE 6 taken in a plane indicated by line 7—7 on FIGURE 6; and FIGURE 8 is a plan view of the opened pouch with the portion torn open positioned in longitudinal alignment with the remainder of the pouch.

For convenience in describing the pouch, it will be described as shown in the drawings, referring to the end of the pouch shown at the top as the top end, the opposite end as the bottom end, the edges at right angle to the ends as the sides, the upper surface as the face, and the opposite surface as the back. It will be understood, however, that the pouch can have other generally rectangular shapes than the preferred oblong shape shown, e.g., can be square; the respective sides can be otherwise oriented than as herein described, and the tab need not be secured to the face or to the top edge thereof, but can be secured to the back or to any desired edge of the pouch or package provided the tab is properly positioned so that when grasped and moved away from the package the film to which it is secured tears in a direction in longitudinal alignment with the length of the tab to open the package and make its contents available, desirably resting on the other film surface of the pouch from that which is torn open.

Referring to FIGURES 1 to 5, FIGURE 1 shows the formation of the pouch by folding a polyhaloethylene or other thermoplastic film, preferably transparent and of oblong shape. This fold is along the transverse median of the sheet forming the fold line 10, face 11, and back 12, having the die lines thereof extending across the width as shown by the arrows on the face 11. The latter is defined by sides 13, 14, top edge 15 and bottom edge 16. Back 12 is defined by side edges 17 and 18, bottom edge 19 and its top edge 15 which is common to the face 11 and back 12. All bounding edges of the face 11 and back 12, when these surfaces lie flat in overlapping relation, are coincident.

In the embodiment of the invention shown in FIGURES 1 to 5, the top of the pouch is heat sealed at 21, to provide a double closure; one the fold line 15 and the other the heat seal 21 extending across the width of the film. This heat seal and the other heat seals hereinafter described can be formed by conventional sealing equipment such as the hot bar or other thermal sealing, radio frequency or ultrasonic frequency seals. The expression "heat seal" is used herein in a broad sense to include all such seals as well as other seals formed by available sealing equipment for sealing thermoplastic films to form hermetic closures.

Thereafter the tab 22 is heat sealed at 23 to the face 11 at the upper end thereof. Tab 22 preferably is of polyhaloethylene, a thickness about twice that of the thickness of the film face 11, and has its die lines disposed in the direction of its length as shown in FIGURE 3 by the arrows on the tab. The width of the tab at its base 24 desirably is about the same as the linear distance between the heat seals 25 and 26 at or near the side edges of the pouch. By having at least the opposite ends of the lower portion of the tab sealed to the film face 11, at or near the heat seals 25 and 26, these ends of the tabs provide guides for starting the tear of the film face 11 at the points where the tab ends are secured to the film face 11.

Top end 27 of tab 22 protrudes beyond the top edge 15. In this way end 27 of tab 22 and the portion of the package beneath the free end 27 of tab 22 are readily available for grasping when it is desired to open the package.

Heat seals 25 and 26 can be positioned close to but spaced from the sides of the pouch as shown in FIGURE 3, or at the sides as shown in FIGURE 4. In either case they extend the full length of the package and provide hermetic seals for the sides of the pouch.

The suture 28 is then inserted through the open end of the pouch. If desired, a conditioning liquid 30 such as an aqueous solution of ethanol and/or isopropanol can be introduced into the pouch along with the suture. Thereafter the lower end is sealed as at 29 to form the completed package 31 shown in FIGURE 4.

To open the package, tab 22 is grasped as shown in FIGURE 5, while the portion of the package therebeneath is grasped by the fingers of the other hand. Movement of tab 22 away from the package causes the face 11 to tear along the inner sides of the heat seals 25 and 26. The major portion of the face film 11 and the tab attached thereto, as shown in FIGURE 5, can be moved away from the back 12 to allow removal of sterile suture 28 without fear of contamination. The polyhaloethylene films hereinabove disclosed, I have found, when heat sealed with the heat seals extending at right angles to the die lines, have the least tear resistance in the area of such heat seals. This factor plus the disposition of the fastened end of the tab, as shown in FIGURES 3, 4 and 6, so that the sides of the lower fastened end of the tab are positioned adjacent or near the heat seals 25 and 26, result in the package being torn open readily and cleanly along the inner side edges of the heat seals at the side of the package when the tab is moved away from the film to which the tab is secured.

The parts of the FIGURES 6, 7 and 8 modification are identified by the same reference characters as the like parts of the FIGURES 1 to 5 modification. The chief differences between these two modifications are:

(1) Tab 22 is heat sealed to the face 11 by two spaced heat seals 22a and 22b. This gives added firmness to the bond between the tab 22 and the film face 11. Should for some reason the seal 22a between the tab and film face 11 fail, the seal 22b will maintain the tab bonded to the film face 11 and serve to obtain the desired tear-open characteristic of the package;

(2) The pouch does not have the heat seal 21 of FIGURES 1 to 5, inclusive;

(3) Tab 22 is heat sealed to the end of the pouch opposite the fold line 15;

(4) Heat seal 29a is formed at one end of the package spaced from the end of the pouch as best shown in FIGURE 6. This heat seal is formed after insertion of the article or material to be packaged through the then open end. Thus there is formed beneath the tongue 22 an extending portion of the face film 11 and back 12 which can readily be grasped when the tongue 22 is grasped to open the package. The open pouch portion of the package is shown in FIGURE 8. It will be noted that the pouch when open remains in one piece; there is no loose piece to be accounted for in an operating room, as is the case with the tear-off or cut-off ends.

The polyhaloethylene film package containing the suture or other article or material can be sterilized by treatment with steam or radiation or can be stored in germicidal solutions, e.g., dilute formaldehyde, without adversely affecting the film or packaged suture. Alternatively, the polyhaloethylene film package containing the sealed suture or other article or material may be placed in a second pouch and sealed, thereby providing an outer package to aid in preserving the sterility of the inner sealed package until ready for use. This outer package may be made from the same thermoplastic material used in making the inner package but preferably is composed of a different thermoplastic material such as polyethylene, polyvinyl chloride, polymeric ester of terephthalic acid and ethylene glycol or laminates thereof.

The completed package made from polyhaloethylene film, as hereinabove disclosed, combines to a unique extent:

(1) Transparency plus superior barrier properties, particularly imperviousness to the passage through the film of air, gasses and vapors encountered in the atmosphere or under usual conditions of use of the package and its contents;

(2) Superior barrier properties to air and such gases and vapors, and yet can be effectively sterilized by treatment with sterilizing gases, steam or radiation;

(3) High strength of the film to provide good protection for the contents of the package, yet can be torn open readily to give access to the contents;

(4) Transparency which gives sales appeal sparkle to the package;

(5) Superior chemical resistance such that single ply film can be used and will not be deleteriously affected by conditioning liquids employed in the handling of wet sutures or by germicidal solutions used when storing the sealed suture; and (6) Sealability of the single ply film to form the pouch employing available heat sealing equipment such as the known impulse or hot bar sealing machines.

Since different embodiments of the tear-open thermoplastic film package of the invention could be made without departing from the scope of this invention, it is intended that all matter contained in the above description or shown in the accompanying drawings shall be interpreted as illustrative and not in a limiting sense.

I claim:

1. A tear-open sealed thermoplastic film package consisting essentially of a generally rectangular pouch having a single thickness thermoplastic film face and film back, the overlapping side edges of the film face and film back having marginal heat seals forming closures for the sides of the pouch, the pouch being closed at the opposite ends, and a tabe formed of a separate piece of film having a tear strength greater than the tear strength of the film in a direction along the sides of the pouch, and having one end secured to one of said face and said back at one of the ends of the pouch and having the opposite end free and arranged to be grasped and moved away from the package to tear the film to which it is attached along the length of the marginal heat seals and thus open the package.

2. A tear-open sealed thermoplastic film package as defined in claim 1, in which the end of the tab secured to one of said film face and said back at one end of the pouch has a width approximately equal to the distance between the marginal heat seals on the side edges of the package, is heat sealed thereto and the opposite end of said tab extends beyond the said one end of the package to which end of the package the tab is heat sealed.

3. A tear-open sealed thermoplastic film package consisting essentially of a single ply of a thermoplastic material from the group consisting of polytrifluoromonochloroethylene, copolymers of chlorotrifluoroethylene and vinylidene fluoride containing from 0.5% to 10% by weight of vinylidene fluoride, and copolymers of chlorotrifluoroethylene, vinylidene fluoride and tetrafluoroethylene containing from 0.5% to 10% by weight of vinylidene fluoride and from 0.5% to 10% by weight of tetrafluoroethylene, shaped to form a generally rectangular pouch having its face and back consisting of a single thickness film of said thermoplastic material with the overlapping side edges of said face and back heat sealed along the marginal edges thereof to form closures for the sides of the pouch, the pouch being heat-sealed at its opposite ends to hermetically seal the contents of the package, and a tab formed of a separate piece of film having a tear strength greater than the tear strength of the film in a direction along the side edges thereof, and having one end heat sealed to one of said face and said back at one end of the package and having the opposite end free and arranged to be grasped and moved away from the package to tear the film to which it is attached along the length of the marginal heat seals and thus open the package.

4. A tear-open sealed thermoplastic film package as defined in claim 3, in which the thermoplastic material of said face and said back is approximately 1 mil in thickness and the die lines in the film extend across the width of the package, and said tab is of the same thermoplastic material as the film, has a thickness of about 2 mils, and the length of the tab extends at right angles to the die lines of the pouch film.

5. A tear-open sealed thermoplastic package as defined in claim 4, in which the end of the tab secured to the package at one end thereof has a width approximately equal to the distance between the marginal heat seals on the side edges of the package and the free end of said tab extends beyond the end of the package to which the tab is secured.

6. A tear-open suture pack consisting essentially of a generally rectangular pouch having a single thickness thermoplastic film face and film back, with the overlapping side edges of the film face and film back heat sealed to each other to form marginal heat seals closing the sides of the pouch, the opposite ends of the pouch being heat sealed to each other to provide a hermetically sealed enclosure for a wet packed suture, and a tear-open tab formed of a separate piece of film of the same thermoplastic material as the material of the pouch, having one end thereof heat sealed to one of said face and said back at one end of the pouch and the other end thereof free and overlapping the end portion of the pouch, said tab having a tear strength greater than that of the thermoplastic film to which it is attached, the free end of said tab being arranged to be grasped while grasping the portion of the package overlaid by said tab whereupon by movement of said tab away from the package while holding the portion of the package beneath said tab, the film is drawn along the marginal side edge heat seals to permit removal of the suture.

7. A tear-open pack as defined in claim 6, in which the thermoplastic film of the pouch has a thickness of about 1 mil and the die lines in the thermoplastic film extend across the width of the pouch, and the tab has a thickness of about 2 mils and the die lines thereof extend at right angles to the length of the tab.

8. A tear-open suture pack consisting essentially of a generally rectangular pouch having a single thickness film face and a single thicknes film back of a thermoplastic material from the group consisting of polytrifluoromonochloroethylene, copolymers of chlorotrifluoroethylene and vinylidene fluoride containing from 0.5% to 10% by weight of vinylidene fluoride, and copolymers of chlorotrifluoroethylene, vinylidene fluoride and tetrafluoroethylene containing from 0.5% to 10% by weight of vinylidene fluoride and from 0.5% to 10% by weight of tetrafluoroethylene, with the overlapping side edges of the film face and film back heat sealed to each other to form marginal heat seals closing the sides of the pouch, the opposite ends of the pouch being heat sealed to each other to provide a hermitically sealed enclosure for a wet packed suture, and a tear-open tab formed of a separate piece of film of the same thermoplastic material as the material of the pouch, having one end thereof heat sealed to one of said face and said back at one end of the pouch and the other end thereof free and overlapping the end portion of the pouch, said tab having a tear strength greater than that of the thermoplastic film to which it is attached, the free end of said tab being arranged to be grasped while grasping the portion of the package overlaid by said tab whereupon by movement of said tab away from the package while holding the portion of the package beneath said tab, the film is torn along the marginal side edge heat seals to permit removal of the suture.

9. A tear-open pack as defined in claim 8, in which the thermoplastic film of the pouch has a thickness of about 1 mil and the die lines in the thermoplastic film extend across the width of the pouch, and the tab has a thickness of about 2 mils and the die lines thereof extend at right angles to the length of the tab.

10. The combination of a tear-open sealed thermoplastic film package consisting essentially of a single ply of a thermoplastic material selected from the group consisting of polytrifluoromonochloroethylene, copolymers of chlorotrifluoroethylene and vinylidene fluoride containing from 0.5% to 10% by weight of vinylidene fluoride, and copolymers of chlorotrifluoroethylene, vinylidene fluoride and tetrafluoroethylene containing from 0.5% to 10% by weight of vinylidene fluoride and from 0.5% to 10% by weight of tetrafluoroethylene, shaped to form a generally rectangular pouch having its face and back consisting of a single thickness film of said thermoplastic material with the overlapping side edges of said face and back heat sealed along the marginal edges theregof to form closures for the sides of the pouch, the pouch being heat-sealed at its opposite ends to hermetically seal the contents of the package, and a tab formed of a separate piece of film having a tear strength greater than the tear strength of the film in a direction along the side edges thereof, having one end heat sealed to one of said face and said back intermediate the ends of the package and having the opposite end free and arranged to be grasped and moved away from the package to tear the film to which it is attached along the length of the marginal heat seals and thus open the package, with a surgical suture contained in said sealed thermoplastic film package.

References Cited
UNITED STATES PATENTS

| | | | |
|---|---|---|---|
| 2,653,744 | 9/1953 | Behr | 229—51 X |
| 2,969,145 | 1/1961 | Hannauer | 206—63.2 |
| 3,113,666 | 12/1963 | Will | 229—51 X |
| 3,294,230 | 12/1966 | Penksa | 206—63.2 |

FOREIGN PATENTS

| | | |
|---|---|---|
| 789,289 | 1/1958 | Great Britain. |
| 556,445 | 2/1957 | Italy |

JOSEPH R. LECLAIR, *Primary Examiner.*

LOUIS G. MANCENE, *Examiner.*